G. J. BARRETT.
AUTOMATIC COIN PAYING AND CHANGE MAKING MACHINE.
APPLICATION FILED DEC. 17, 1915.
1,247,618.
Patented Nov. 27, 1917.
10 SHEETS—SHEET 1.
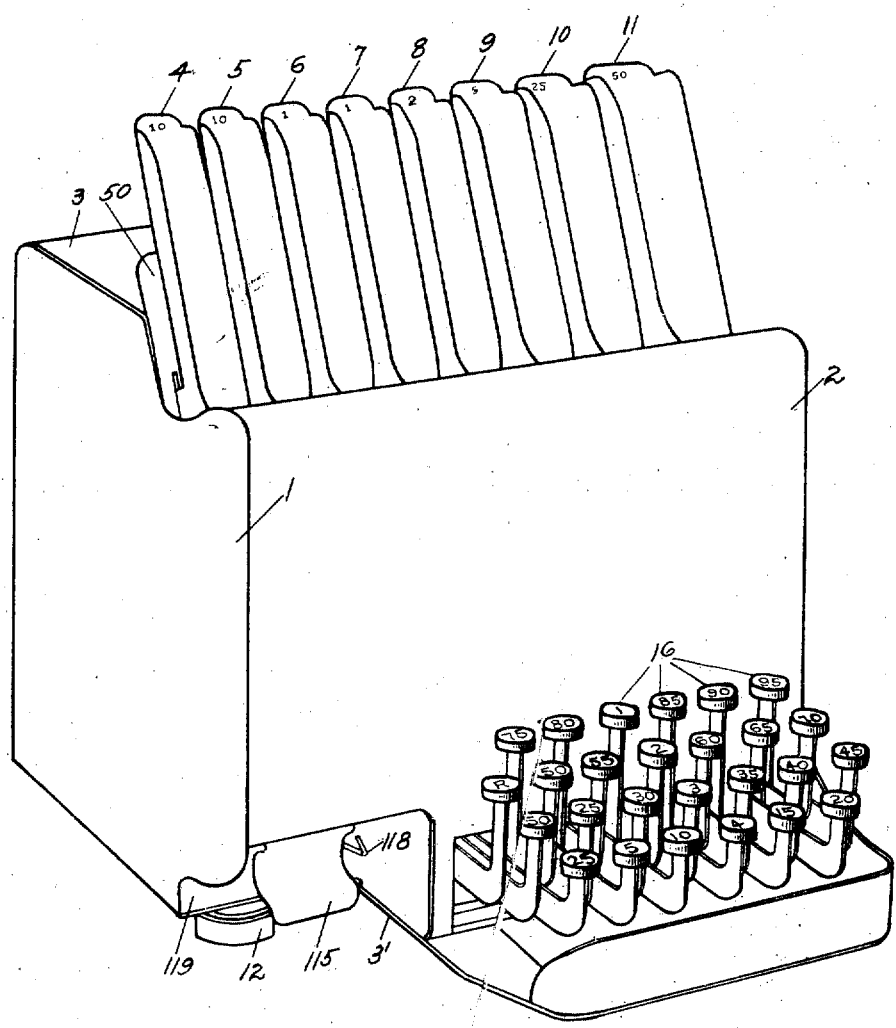
Fig. I.
WITNESSES:
P. M. Pomeroy
H. P. Beare
INVENTOR.
GLENN J. BARRETT.
BY Chappell & Earl
ATTORNEYS.

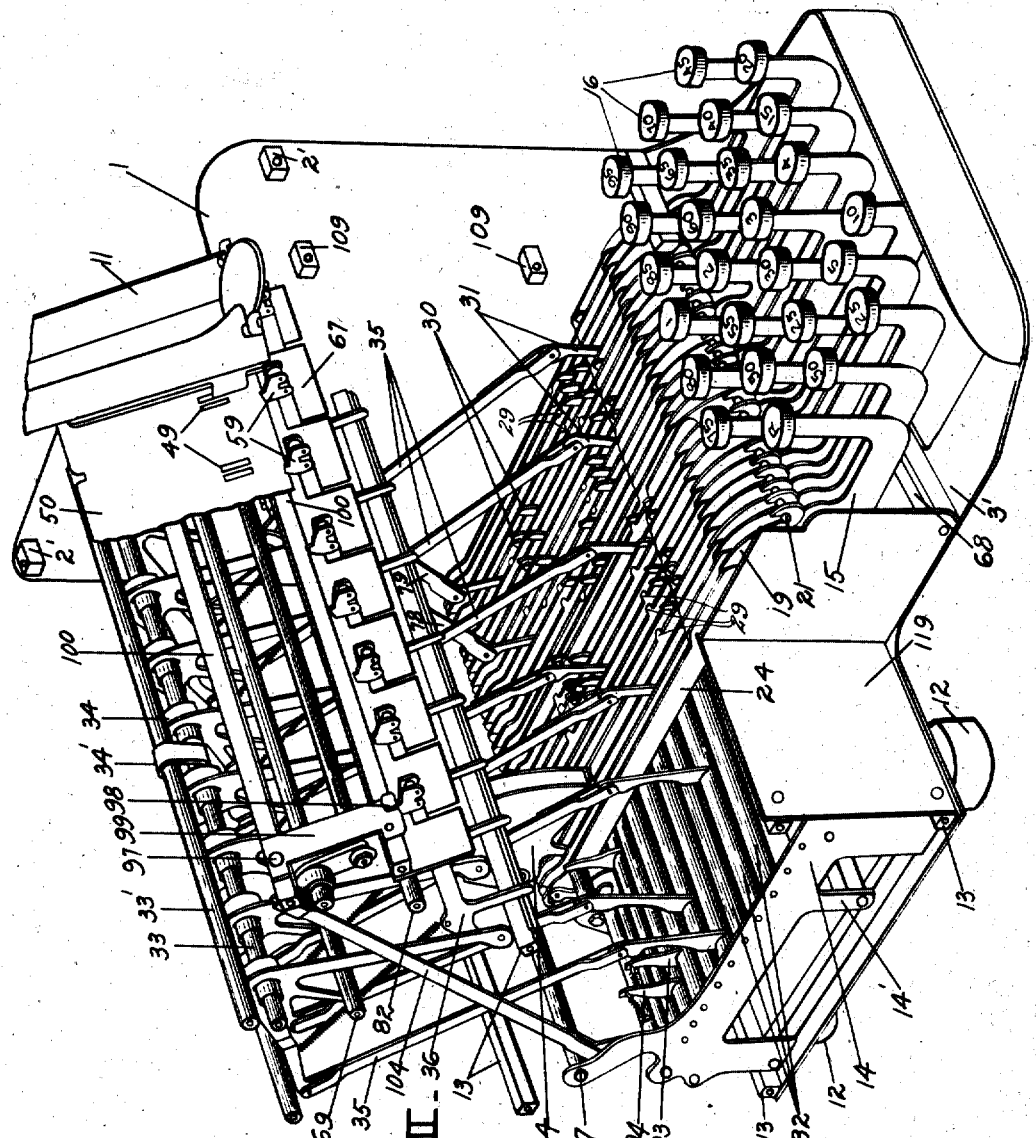

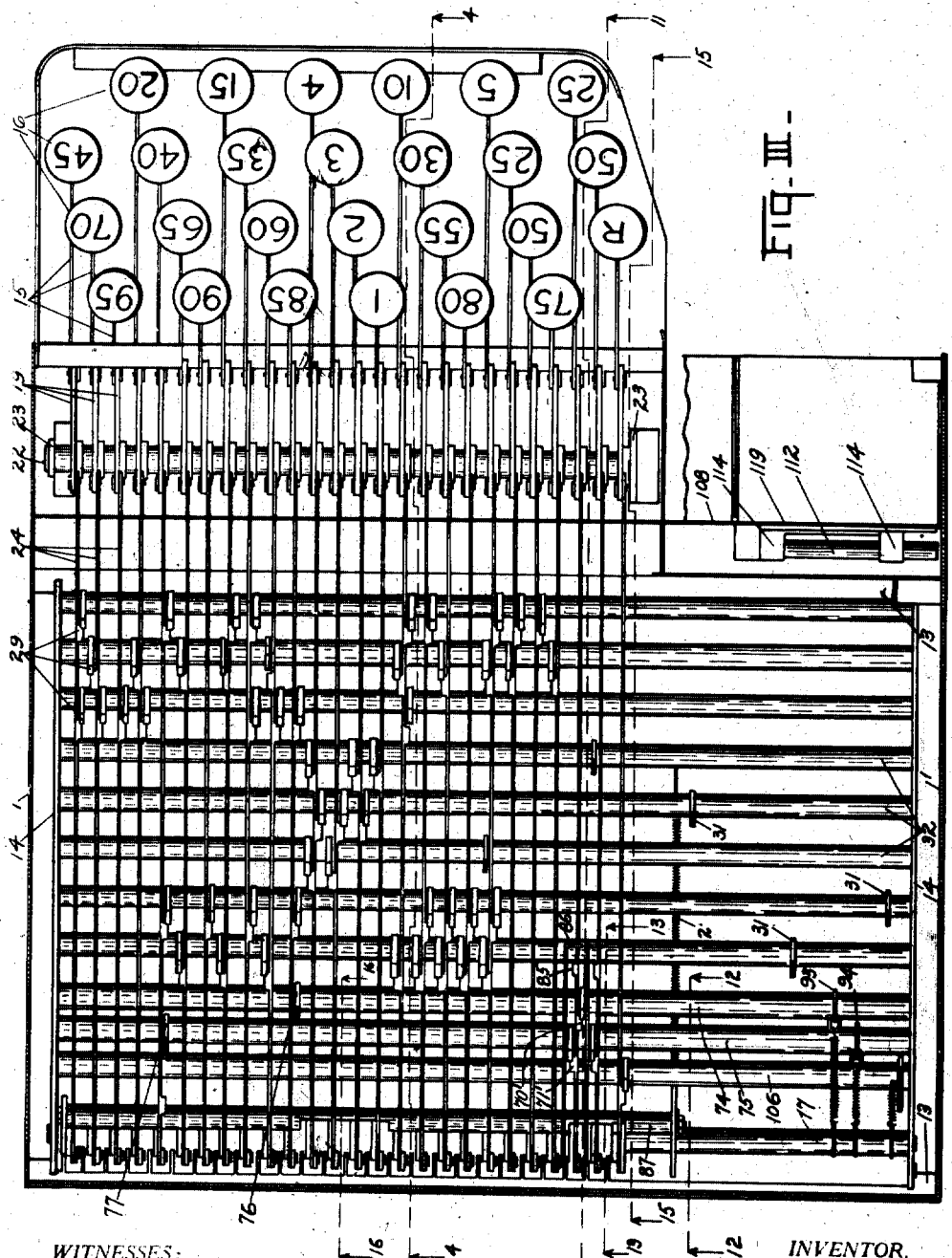

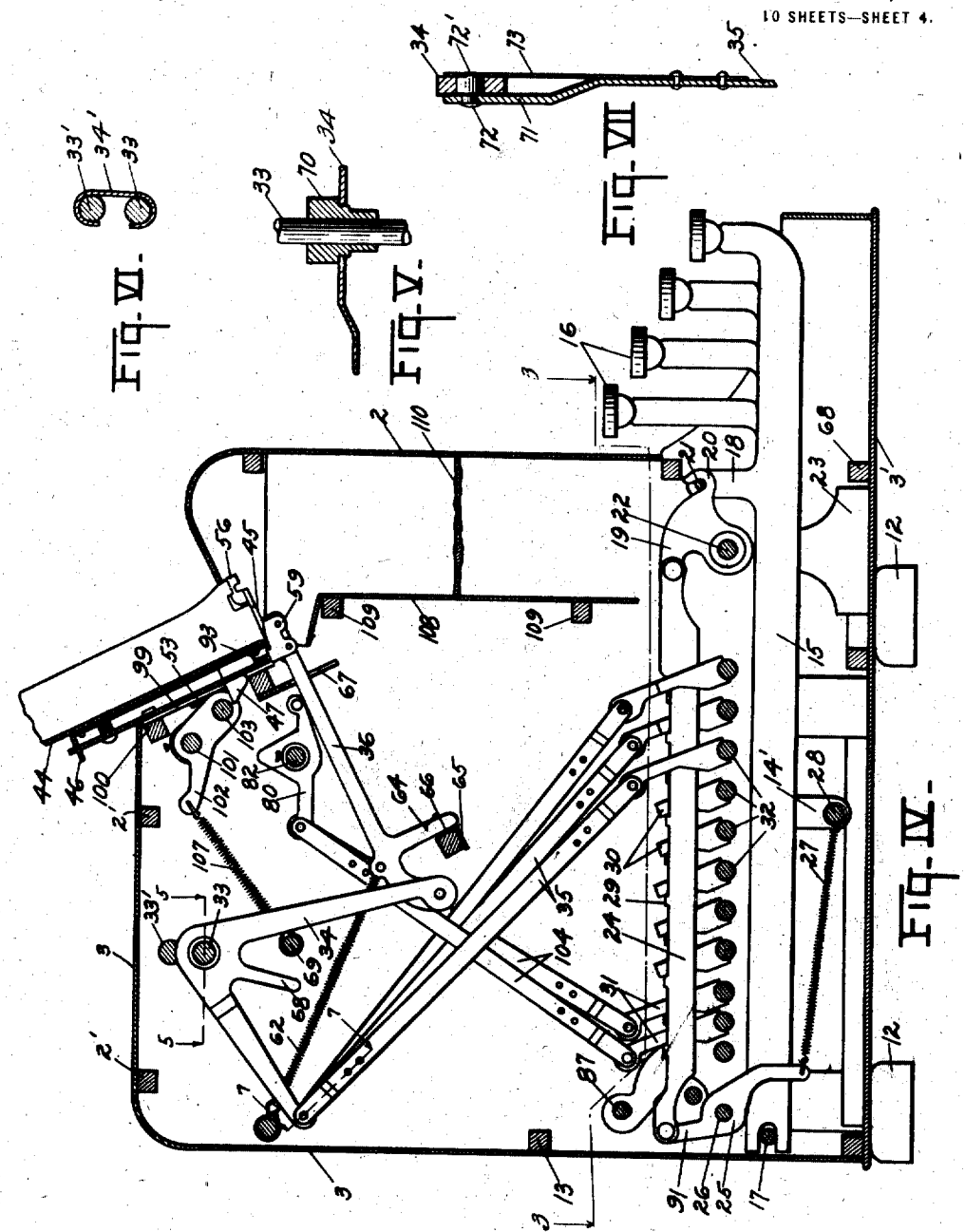

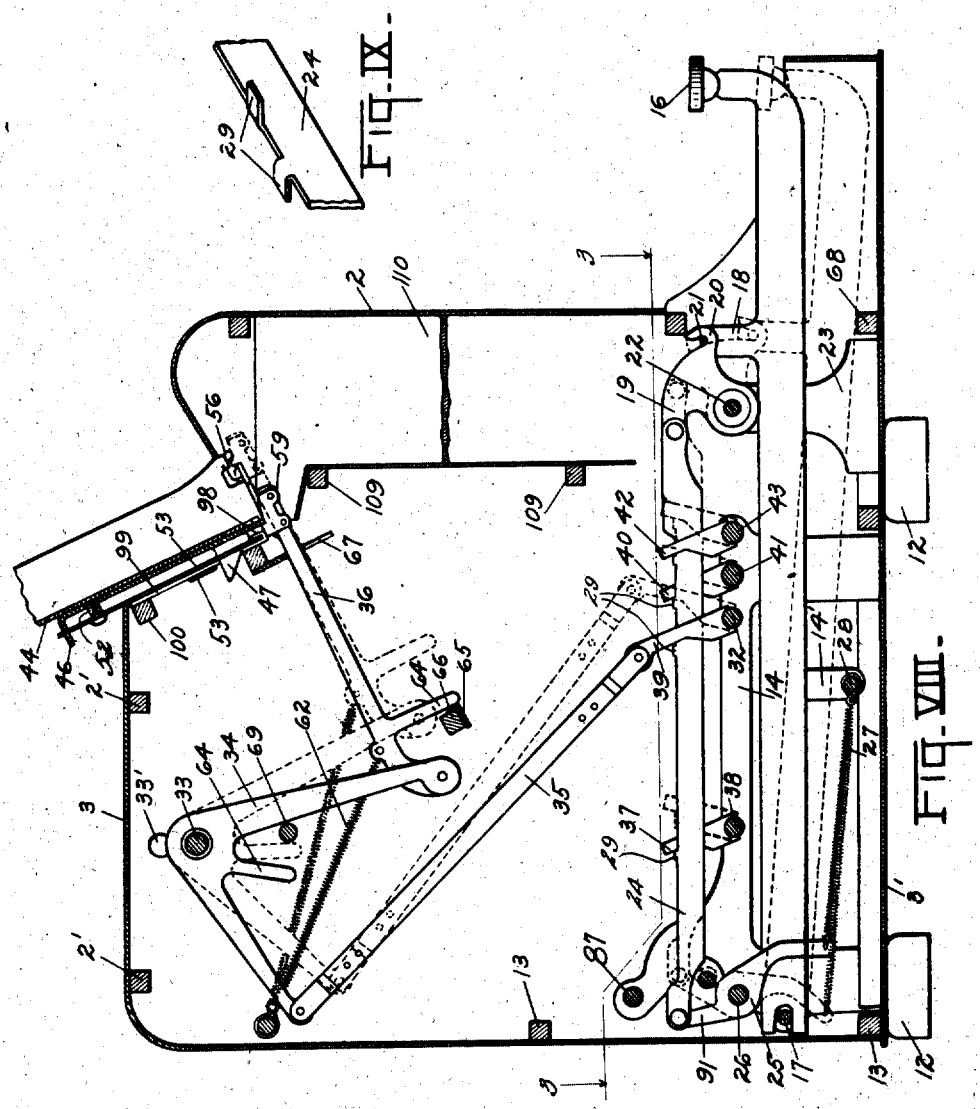

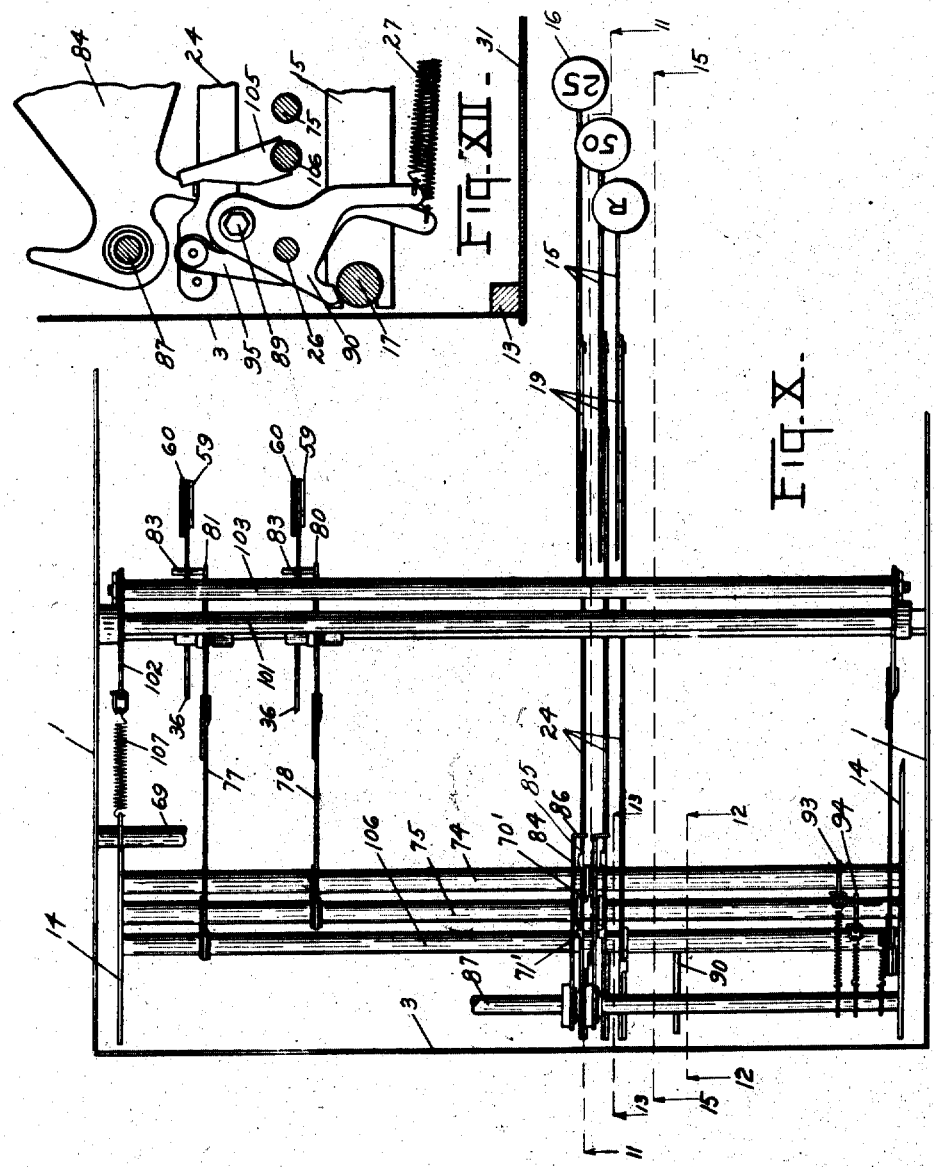

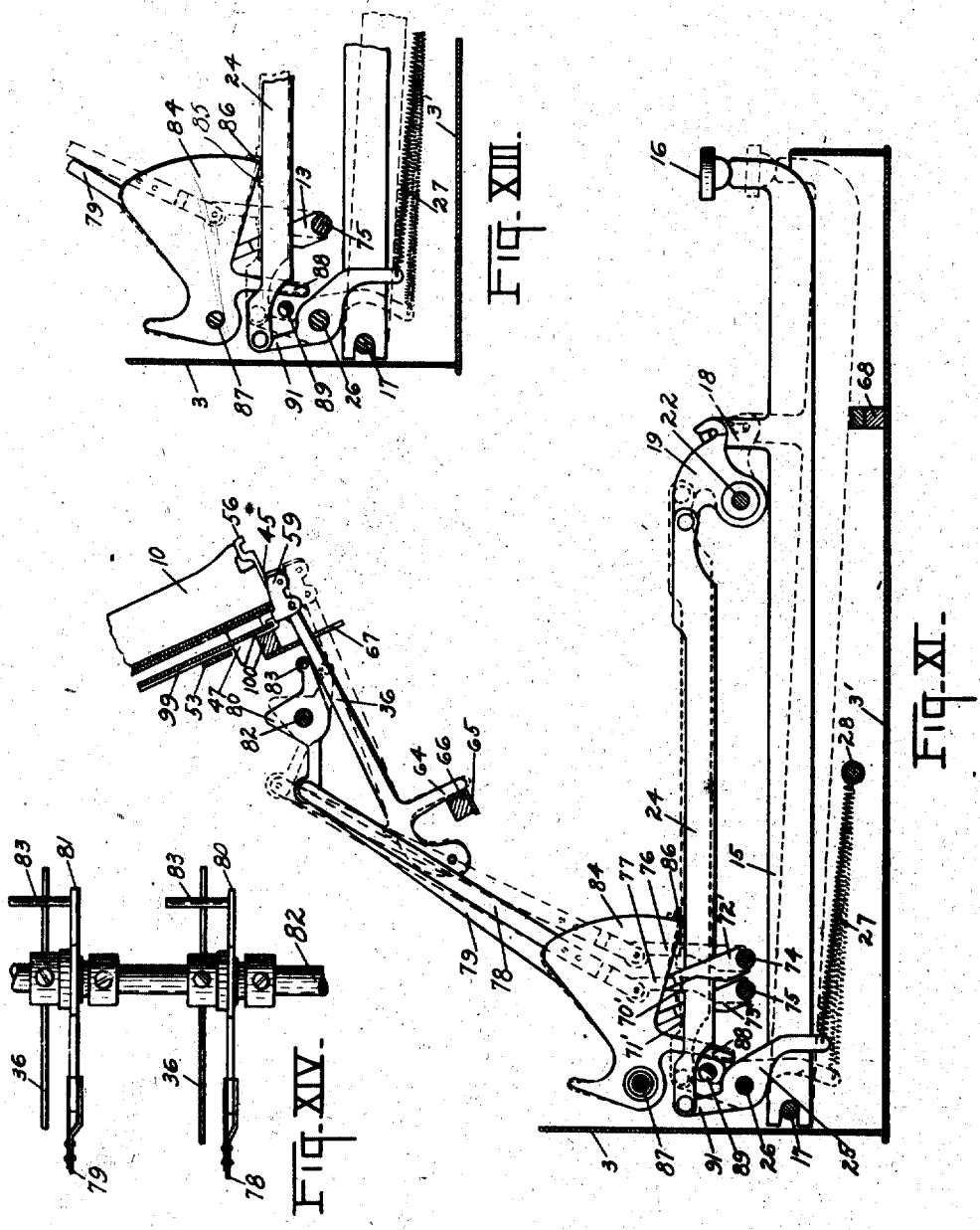

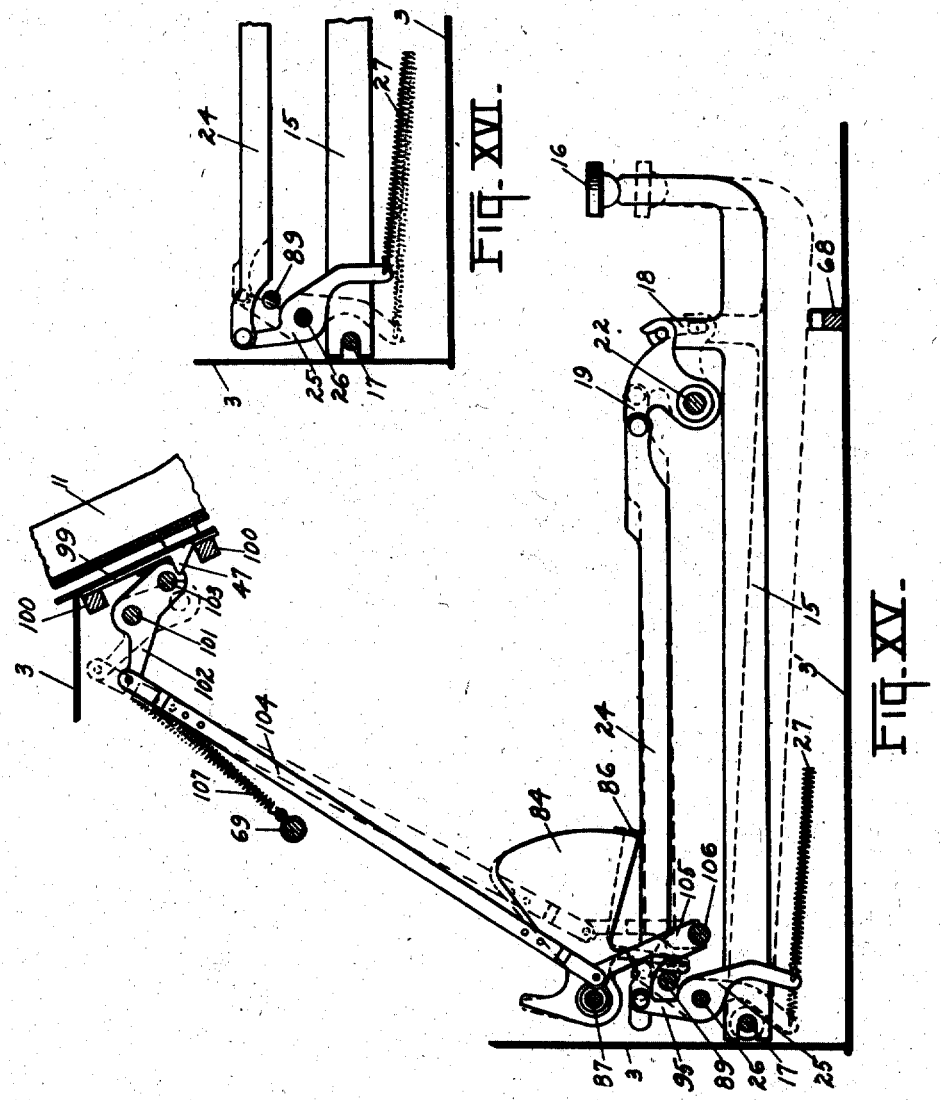

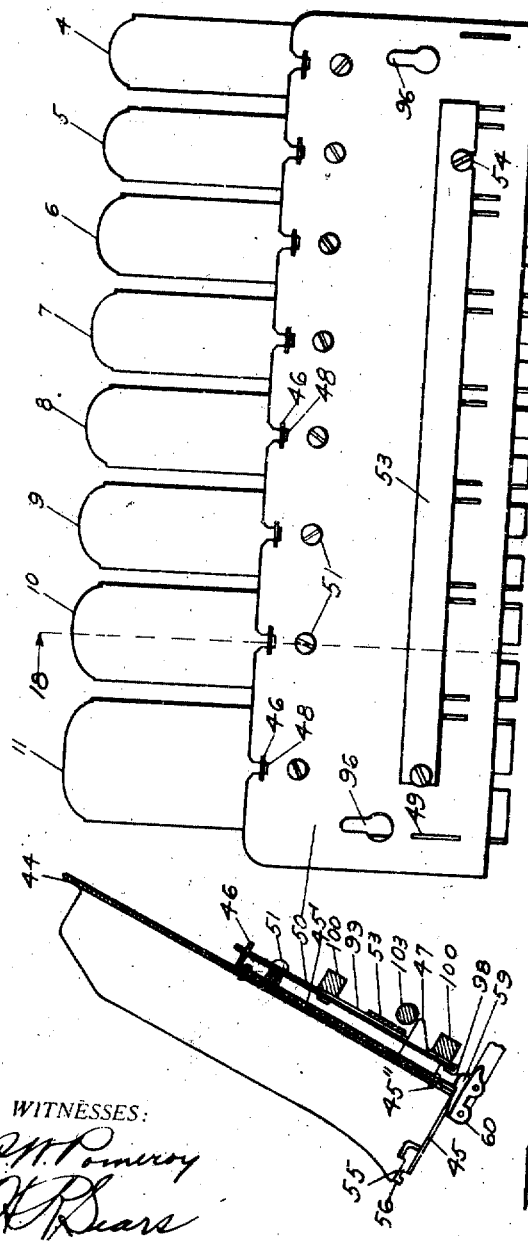

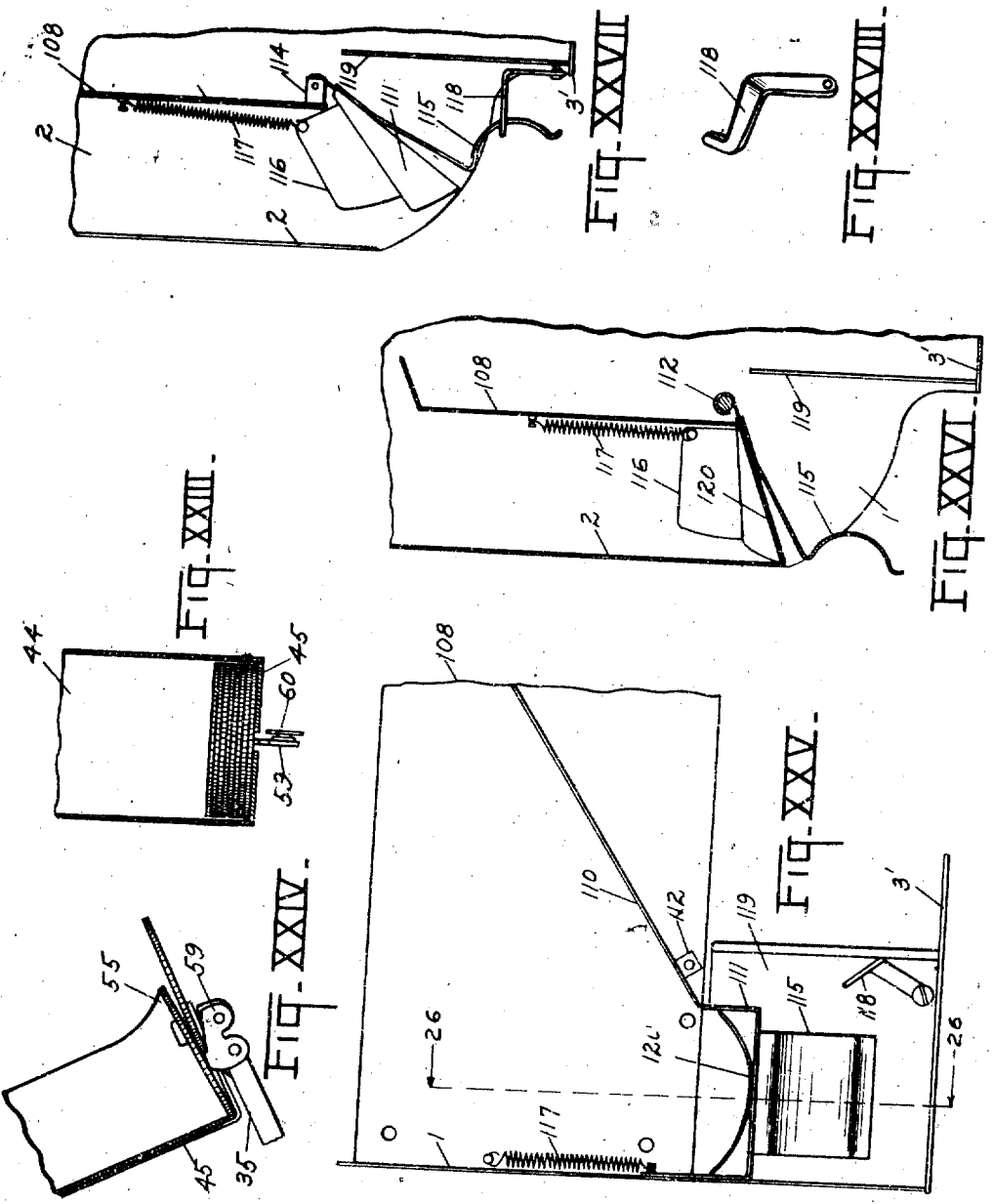

UNITED STATES PATENT OFFICE.

GLENN J. BARRETT, OF GRAND RAPIDS, MICHIGAN, ASSIGNOR TO BARRETT CHANGER CO., OF CHICAGO, ILLINOIS.

AUTOMATIC COIN-PAYING AND CHANGE-MAKING MACHINE.

1,247,618.  Specification of Letters Patent.  Patented Nov. 27, 1917.

Application filed December 17, 1915. Serial No. 67,423.

*To all whom it may concern:*

Be it known that I, GLENN J. BARRETT, a citizen of the United States, residing at Grand Rapids, in the county of Kent and State of Michigan, have invented certain new and useful Improvements in Automatic Coin-Paying and Change-Making Machines, of which the following is a specification.

This invention relates to improvements in automatic coin paying or change making machines.

The objects of this invention are:

First, to provide a machine designed to automatically make change based upon the tendering of one dollar, and particularly to make change by the depression of one key when the said change is a multiple of five and the depressed key represents the purchase price.

Second, to provide a machine having the key board in proximity to the point of delivery.

Third, to provide a machine having a key board easily covered by the hand, thus enabling the operator to follow out a touch system.

Fourth, to provide a machine having a condensed key board, thus enabling the buttons to be spaced farther apart thereby reducing to a minimum the liability of depressing more than one button.

Fifth, to provide a machine having a system of coin tube trays adapted to be individually removed or removed in a block.

Sixth, to provide a mechanism for locking said tubes into position and a means for unlocking them, operated from the keyboard of the machine.

Seventh, to provide a machine having coin tube trays exposing every coin to the full view of the operator.

Eighth, to provide in a machine a coin ejector mechanism which will absolutely catch and eject the precise number of coins required for the given change.

Ninth, to provide a machine wherein the ejectors when returned to their normal position will automatically and positively reposition themselves behind the next coin or coins to be ejected.

Tenth, to provide an ejector structure admitting of a single spring to hold the ejector in its normal position and to draw the same back to its normal position.

Eleventh, to provide a machine having a rock shaft mechanism with direct connections between said rock shafts and each ejector mechanism corresponding with the respective coin tubes.

Twelfth, to provide a machine having a practical and direct selecting mechanism for operating any desired rock shaft from each of the respective key levers.

Thirteenth, to provide a machine having certain eliminating mechanisms whereby change may be made direct from fifty cents or twenty-five cents or both.

Fourteenth, to provide a machine having a trap door structure whereby a slight movement of the same causes the coins to be released into the hand or a tray or delivery chute.

Further objects, and objects relating to details and economies of construction and operation will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing forming a part of this specification, in which:

Figure I is a perspective view of an automatic coin paying machine embodying the features of my invention.

Fig. II is a perspective view of an automatic coin paying machine with the cover removed and parts of the casing broken away showing the principal mechanism of the same.

Fig. III is an enlarged detail sectional plan view of the keyboard showing the arrangement of the key levers and their connecting rock arms and rock shafts, taken on a line corresponding to line 3—3 of Figs. IV and VIII.

Fig. IV is a detail vertical section through the machine showing the operating mechanism, taken on a line corresponding to line 4—4 of Fig. III.

Fig. V is a detail horizontal sectional view showing how the ejector bell crank is carried, taken on the line 5—5 of Fig. IV.

Fig. VI is a detail vertical sectional view showing how the ejector bell crank shaft is supported at its center.

Fig. VII is an enlarged detail vertical sectional view showing the connection of the ejector bell crank to a connecting link 35, taken on line 7—7 of Fig. IV.

Fig. VIII is a detail, vertical sectional view similar to that of Fig. IV, showing the 10¢ key in its normal position and the same depressed as shown by dotted lines, all other keys omitted on the same line 4—4 of Fig. III.

Fig. IX is an enlarged perspective view of the draw bar 24 showing how the actuating ears are formed thereon.

Fig. X is a plan view of the release key and of the 50 and 25 cent eliminator keys and their connecting mechanism, the rest of the machine being omitted.

Fig. XI is a detail vertical section showing the 25¢ eliminator key with its connection to the 25¢ coin tube in its normal position and the same depressed as shown by the dotted lines, taken on a line corresponding to the broken section line 11—11 of Figs. III and X.

Fig. XII is a partial detail vertical section showing the connections at the rear of the release key lever taken on line 12—12 of Figs. III and X.

Fig. XIII is a partial detail vertical section, showing the connection to the rear end of the 50¢ eliminator key lever taken on line 13—13 of Figs. III and X.

Fig. XIV is an enlarged detail plan view of the levers which depress the 25¢ and 50¢ ejectors.

Fig. XV is a detail vertical sectional view showing the release key lever and its connections for releasing the coin tubes, when in the normal position, and in the depressed position as shown by the dotted lines, taken on the line corresponding to the section line 15—15, of Figs. III and X.

Fig. XVI is a partial detail vertical section showing the connection to the rear ends of the 1, 2, 3 and 4 cent levers, taken on a line corresponding to the section line 16—16 of Fig. III.

Fig. XVII is a rear side elevation of the coin tube back plate showing the coin tubes fastened thereto.

Fig. XVIII is a detail vertical section through the coin tubes, taken on a line corresponding to the section line 18—18 of Fig. XVII.

Fig. XIX is a detail front elevation of the lower part of one of the coin tubes with coins therein.

Fig. XX is a front elevation of one of the coin tubes, showing how the ejector bears against and coacts with the same.

Fig. XXI is a detail horizontal section showing how the lowermost coin rests in the coin tube, taken on a line corresponding to the line 21—21 of Fig. XIX.

Fig. XXII is a detail vertical section through one of the coin tubes, showing how the coin is caught by the ejector catch, taken on a line corresponding to the section line 22—22 of Figs. XIX and XX.

Fig. XXIII is a detail vertical section through one of the coin tubes, showing how the coin ejector passes under the coin on its return stroke, taken on a line corresponding to line 23—23 of Fig. XXI.

Fig. XXIV is a detail vertical section through one of the coin tubes, showing the next to the last coin partially ejected therefrom and how the last coin falls in place so as to be properly caught by the ejector catch when the same returns to its normal position.

Fig. XXV is a front elevation of the machine with the front cover plate removed, showing the coin discharge chute and the hand operated discharge trap door.

Fig. XXVI is a detail vertical sectional view through the hand operated trap door, taken on the section line 26—26 of Fig. XXV.

Fig. XXVII is a side elevational view showing how the hand operated trap door may be hooked in a discharging position.

Fig. XXVIII is a perspective view of the trap door hook 118.

In the drawing similar reference characters refer to similar parts throughout the several views, and the sectional views are taken looking in the direction of the little arrows at the ends of the section lines.

Referring to the drawings, I consider the reference characters as representing the parts themselves. The casing of my machine consists of the side plates 1, the front plate 2, the combination rear and top plate 3 and the bottom plate 3'. The front and rear plates are fastened to the lugs 2', secured to the side plates. The top of the machine is partially cut away so as to hold the coin tubes consisting of the two 10¢ tubes 4 and 5, the 1¢ tubes 6, 7, and 8, the 5¢ tube 9, the 25¢ tube 10, and the 50¢ tube 11. The keyboard, as is usual in this type of machine, consists of rows of keys suitably stepped one above the other as shown.

The whole machine is supported on the rubber feet 12. The side plates partially constitute the frame of the machine and are connected by the square cross rods 13 and various round rods hereinafter described. Within the casing are the two end plates 14 which serve as bearings for the rock shafts, key lever shafts, etc., as hereafter shown. The key levers 15 (Fig. IV) are the same in number as the buttons shown on the keyboard. The front end of the key levers are turned up so as to carry the button 16 as shown. The other end of the key levers fulcrum about the key lever rod 17, said rod being secured to the two end plates 14. From each key lever is a vertically extending arm 18 adapted to connect to the draw bar bell cranks 19, said bell cranks having the hooked portion 20 for engaging the cross pin 21 of the arm 18. All draw bar bell cranks are journaled by suitable bushings on rod 22, said rod being supported by a pair of auxiliary end plates 23. The rear end of the draw bar bell cranks are pivotally connected to the front end of the draw bars 24. The rear end of the draw bars 24 are pivotally connected to the draw bar levers 25, said levers are journaled by suitable bushings on the draw bar lever rod 26. Rod 26 is retained by the end plates 14. The draw bars and key levers are held in their normal position by springs 27 which are hooked to rod 28 supported by depending arms 14' of end plates 14. From the top edge of draw bars 24 project the ears 29, some projecting to the right and some to the left, as shown in Figs. II and IX. Each draw bar has the necessary number of ears for forming the given combination as hereinafter described.

The various ears of the draw bars are adapted to operate the short rocker arms 30 and the long rocker arms 31. Rocker arms 30 and 31 are rigidly connected to the rock shafts 32 said rock shafts being journaled in the end plates 14. Near the top and at the rear of the machine and carried by the side plates is the ejector bell crank supporting rod 33. The rod 33 is supported at its center from cross rods 33' by strap 34'. Journaled with suitable bushings on rod 33 are the ejector bell cranks 34. One arm of each ejector bell crank 34 is connected to a corresponding long rock arm 31 by connecting link 35. The other arm of the bell crank is connected to the corresponding ejector 36 and operates the same, the number of ejectors and ejector bell cranks being the same as the number of coin tube trays. A rock shaft is provided for and connected by a single mechanism to each ejector.

I have thus far shown in general the connection of the key levers to the ejectors. The following portion of the description will show how I work the combination necessary to get 90¢ in change, on the depression of the 10 key as shown in Fig. VIII. The change ejected by the machine will consist of a 50¢ piece, a 25¢ piece, a 10¢ piece and a 5¢ piece, the various ejectors kicking out the said coins simultaneously. The number of ears on the "10" draw bar is four. These ears engage three of the short rocker arms and one long rocker arm. The short rocker arm 37 is connected to the "10" rock shaft 38, that is, rock shaft 38 is connected as previously shown to the ejector for kicking out a 10¢ piece. The long rocker arm 39 is directly operated by the "10" bar and connects to the 5¢ ejector, as is shown in full lines in Fig. VIII. Short rocker arm 40 is connected to rocker shaft 41 which in turn operates the 25¢ ejector. The short rocker arm 42 is connected to rock shaft 43 which operates the 50¢ ejector. Therefore when the 10¢ key is depressed the "10" draw bar is pulled forward and the ears of said bar engaging the various rocker arms turn the same about the respective rock shafts and as the various rock shafts carry a single long rocker arm the various ejectors are operated to eject the given coin.

I have constructed my machine so that the various draw bars when actuated, move forward nearly in a straight line. When one of the key levers is depressed the same has a slight forward displacement which is taken care of by the slot at the end thereof, rod 17 being grooved to retain the said levers and permit such movement (Fig. VIII). It is evident, therefore, that the various draw bars can have on them the various ears necessary for operating different short rocker arms or to operate one of the various long rocker arms so that the required ejectors may be operated to kick out the given change on the depression of the appropriate key.

With this selective mechanism, my machine is capable of a great many combinations. The various ears project from one side or the other for construction purposes only. The arrangement of the various short and long rocker arms on their rock shafts is clearly shown in plan in Fig. III The long rocker arms are of various lengths so as to give the ejectors the proper travel necessary for ejecting the various size coins. The dime ejector has less movement than the half dollar ejectors.

The following portion of my description will take up the coin tube construction and the details of the ejector and the manner in which it kicks out a coin. Each coin tube (Fig. XVIII) consists of two pieces of sheet metal, the sides and back 44 being formed integrally and the bottom plate 45 turns up at 45', see Fig. XX, and is riveted at 45'' to the back of the tube. From the back portion of the bottom plate and at the top thereof projects the notched tongue 46. Near the lower end of said back portion projects a couple of notched ears 47. The notched tongue 46 and the notched ears 47 are adapted to engage the slots 48 and 49 respectively of the coin tube back plate 50. The coin tubes are held securely to the back plate by the screws 51 which screw into the boss 52 securely fastened to the said tube. The tubes are further held in place on the back plate by cross-bar 53, said bar being pivotally mounted at one end and at the other end a notch engages the screw 54. This bar bears against the top of the notched ears 47 as shown in Fig. XVIII and is normally held in place by an outward spring tendency of the same against screw 54. The back plate is fastened to the back end of the machine by means hereinafter described.

The coin tubes and the back plate set at an angle as shown in Figs. XVIII and XXII, the side wall of each tube being curved forward to partially embrace the coins toward the bottom and at their lower ends form the coin retainers 55 beneath which the bottom coins are ejected. These ears do not extend to the bottom of the tube but are just the proper height above the same so as to permit the necessary coin or coins to be ejected. At the outside edge of bottom plate 45 and at the forward end thereof are the two guide ears 56, said ears serving to guide the coin when ejected from the tube. The bottom 45 is slotted at 57 to permit the ejector to slide therein and is partially cut away at the front portion thereof so that the coin will not have to be pushed farther than necessary before it drops onto the discharge chute. Slot 57 also extends upwardly on the back wall of the tube as shown in Fig. XX. The back wall of the coin tubes 44 at their lower edge are also notched out at 58 as shown in Fig. XX. At the front end of ejector 36 and on each side thereof is an ejector catch 59 and an ejector clip 60 both made of hardened steel and securely riveted together. The ejector clip is separated from the ejector by a pair of washers 61.

On the top side and at the rear end of the ejector catch is a tooth 62 shouldered to the top edge thereof, said top edge being slightly rounded as shown in Fig. XXII. The height of the shoulder is a trifle less than the thickness of the coin to be ejected. The catch as thus described will normally engage the edge of the coin and eject the same when a key is depressed. However, when the ejector is returning to its normal position, the tooth of the catch will yieldingly bear against the bottom coin, Fig. XXIII, until the tooth disengages the back edge of the coin and the ejector is again in its normal position, as shown in Fig. XXII. However, to insure the tooth 62 to properly engage the coin, the clip 60 is rounded on top and so proportioned that when the ejector is in its normal position, the catch will be properly set so as to engage the coin to be ejected by said clip bearing against the bottom plate as shown in Fig. XVIII. As the engaging end 59 of the catch advances the rounded incline of the bottom of the notch engages the rear bottom edge of the coin thereby forcing the arm which carries the catch down slightly while the coin is being ejected, so that the guide clip 60 does not actually bear upon the bottom of the coin tray and thus unnecessary wear is avoided: the main object of this clip 60 being to prevent the tension of the ejector arm from uplifting the coins during the return movement of the ejector, and when there are but few coins left in the tray. This clip 60 is carried to one side of the catch 59 so that by simply twisting the ejector arm 36 the ejector catch may be elevated into the proper coöperative relation with the bottom of the coin tray.

The ejector catch that operates coin tube 8 is so designed as to catch two pennies, this being the only case in this machine where two coins are kicked out by the same ejector.

The notch 58 in the rear wall of tube 44 serves to allow the next to the last coin to drop into the same, as shown in Fig. XXIV, the top side of the slot engaging the top side of the coin. The coin is thus kept from jumping around in the tube from the upward recoil of the ejector when the same is returning to its normal position, a thing which occurs in many machines when the tubes are nearly emptied and particularly when the machine is rapidly operated. In this connection, the clip 60 serves to limit the said recoil and prevents disturbing the coin and permits the engagement of the rear edge of the coin to be effective.

Besides spring 27 for returning the released key lever to its normal position, a spring 62 connected to each ejector serves to hold it yieldingly against the tubes and return the same to their normal position. To insure the catch 59 to properly contact with the coin when in the normal position a projecting arm 64 strikes a stop strip 65 securely fastened to one of the frame cross rods 66. This, therefore, has a tendency to kick the ejector arms upward and is of great advantage when the machine is rapidly operated.

All of the ejectors are normally guided by the slots in the comb 67, Fig. II. The cross piece 68 serves to limit the depression of the key levers. The floating structure of the ejectors, therefore, permits them to automatically position themselves and has reduced the sliding contact of the parts to a minimum. Each of the ejector bell cranks is mounted on a bushing 70 which turns on rod 33, Fig. V. Both ends of the connecting link are connected as shown in Fig. VII, said connecting link having an offset portion 71, a pin 72 riveted at the end thereof and a spring 73 adapted to engage the stud 72' of the pin. Therefore, when the spring is bent outwardly the pin may be journaled in the ejector bell crank 34 as shown or the rocker arms and the spring snapped back to engage the stud end of the pin and securely hold the ejector cranks or rocker arms in place, thus allowing an easy means for assembling this portion of the machine.

At the left hand of the keyboard are three keys, a release key designated by R and 50¢ and 25¢ eliminator keys, these three keys being preferably of a different color than the remainder of the keyboard. The purpose of the 50¢ and 25¢ eliminator keys is to prevent, when the same are depressed, the "25" and "50" ejectors from engaging the coins and ejecting the same. The release keys serve to release either the 50 of 25 eliminator keys, or both, should it be necessary to do so when the same are unintentionally depressed, and also serve to release the mechanism which locks the coin tubes in place. The key levers, draw bars, rocker arms and connecting links are similar to and operate as those previously described.

Figs. X and XI show the 25¢ eliminator key in the normal and depressed position. On the draw bar for this key are the two ears 70 and 71. These ears engage respectively the short rocker arms 72 and 73, said rocker arms being rigidly secured to the rock shafts 74 and 75 respectively. On rock shafts 74 and 75 are the long rocker arms 76 and 77 respectively. These connect by connecting links 78 and 79 respectively, to the eliminator levers 80 and 81 respectively, said levers being mounted on the rod 82 secured between the side plates 1. Projecting from one end of levers 80 and 81 is the pin 83. Therefore, when eliminator key 25 is depressed the eliminator levers are tilted and pin 83 bears against the ejector and depresses the same so the ejector catch will not contact with the coin in any way. The 25¢ eliminator is caught and held in the depressed position by the pawl 84 engaging the ear 85 on the draw bar, the said engagement taking place by a projecting finger 86 of said pawl. This therefore prevents the eliminator key draw bar from returning to its normal position, thus holding the ejector depressed. The pawl 84 is pivotally mounted on the pawl rod 87 retained by the two side plates and has on the under side of the same a depending finger 88. Between finger 88 and the upper portion of the draw bar levers is the release rod 89, said release rod being held between plates 90, Fig. XII, said plates being pivotally mounted on the draw bar lever shaft 26. When the "25" and "50" ejectors are held down by the depression of the 25¢ eliminator key, the proper change will be made by the depression of the key representing a purchase under 25¢ or between 50¢ and 75¢, as the 25¢ and 50¢ ejectors are not allowed to catch their respective coins. The said ejectors, however, are pushed forward as usual but when the key representing the purchase price is normally in its depressed position the upper portion 91 of the draw bar lever will contact with the release rod 89. Release rod 89 is, therefore, rotated around shaft 26 and coacts with the pawl finger 88 thus lifting the pawl and releasing the eliminator key draw bar from contact with finger 86, the eliminator levers springing back into place.

In the way of the 25¢ and 50¢ eliminator draw bar levers the release rod 89 is slotted, Fig. XI, so that the portion 91 will not interfere with the same when the keys are depressed. When the 50¢ eliminator key is depressed the 50¢ ejector is out of contact with its coin chute, therefore eliminating the ejection of any 50¢ piece for the proper change. The action of the 50¢ eliminator rock shafts 74 and 75 are the rocker arms 93 and 94, respectively. These connect by suitable springs to the key lever shaft 17 and aid in bringing the said levers back to their normal position.

The release key lever is connected similarly as the other levers (Fig. XV) except that the upper half 95 of the draw bar lever pivots slightly farther forward on the draw bar than do the respective levers on the other draw bars. The release key lever, therefore, needs only to be depressed a short distance when the release draw bar lever contacts with release rod 89, thus releasing the 25¢ and 50¢ eliminator keys should they be depressed.

Between the ends of the back plate are the two positioning slots 96, (Fig. XVII). These slots are adapted to engage the studs 97, Fig. II. The lower edge of the back plate is retained in the hooked portion 98 of a pair of positioning back plate clips 99, said clips being securely fastened to a couple of cross rods 100 retained by the side plates 1. Pivotally mounted on shaft 101, Fig. XV, suitably retained by the side plates 1 are a pair of locking rod side plates 102. The two plates are connected at their front ends by the locking bar 103. The other end of one of the plates connects by a connecting link 104, here shown out of place, to release rocker arm 105 secured to the release rock shaft 106. The rear end of the other end plate 102 is connected to one end of spring 107, the other end of said spring being hooked to cross rod 69. When the release key is in its normal position the rocking bar 103 is positioned just above the ears 47 of end coin chutes 4 and 11. As the coin chutes are fastened to the back plate and the back plates held in the machine, as previously described, the same cannot be lifted upward and out of contact with studs 97 as said ears 47 will come against locking bar 103. The beveled portion of ears 47 serve to easily displace the locking bar when the back plate is inserted in the machine. When the release key is depressed, the end plate 102 turning about rod 101 places bar 103 out of any possible contact with the ears 47, therefore enabling the back plate and the tubes fastened thereto to be lifted out, spring 107 serving to bring the plate 102 back to normal position.

I have, therefore, provided an easy way of replacing and removing the coin tubes *en bloc*, together with the back plate.

By reference back to the description of my coin trays, consisting of pieces 44 and 45 it will be understood that by removing the screws 51 and the cross bar 53, which are shown in assembled positions and serve to lock all my trays upon a common carrier, that each tray then becomes an independently removable tray and its ears are acted upon by the common locking shaft 103 as they project through the plate 50. The engaging ears 47 of each tube are in the same plane. When in normal positions, by depressing the release key in the keyboard and while screw 51 and cross bar 53 are removed, any tray may be taken from the carrier plate 50 and conveniently replaced. This is an important feature as it enables an operator to have filled tubes of coin mostly used which can replace the empty ones instantly. This feature is stated as the fifth object on page 2.

In the central part of the key-board of my machine are the 1, 2, 3 and 4 keys. These operate independently of all the other mechanism, that is, none of the other keys will operate the ejectors for tubes 6, 7 and 8. The mechanism for these four keys is the same as that for the other keys. The 1 key when depressed serves to eject 1¢ out of tube 7, the 2 key when depressed serves to eject 1¢ out of both tubes 6 and 7, the 3 key when depressed serves to eject 1¢ out of tube 6, and 2¢ out of slot 8, and the 4 key when depressed serves to eject 1¢ out of tubes 6 and 7 and 2¢ out of the tube 8.

The release rod 89 is notched in way of the 1, 2, 3 and 4 draw bar levers so that these keys will not release the 25¢ or 50¢ eliminator keys when depressed. Therefore, when change not a multiple of five is to be made, the key representing the first multiple of five above the purchase price and the key representing the difference between the purchase price and the said multiple above mentioned are depressed—viz: should the amount of the purchase price be 27¢ and the amount paid 50¢, the 50 eliminator key would be depressed and the 30 and 3¢ key depressed, giving 23¢ in change.

Inside of the housing and beneath the front end of the ejectors is the apron 108 supported by the lugs 109 secured in the side plates. Between the apron 108 and the front plate 2 is the slanting discharge chute 110 sloping downwardly from the 50¢ ejector to the trap door 111, said chute resting on the bars 112, secured by the apron and the front plate. The trap door 111 is pivotally mounted on the pin 112 and is provided with a curved bottom piece 120 to centralize the coins as they are ready for delivery, said pivot pin being fixed in block 114 secured to apron 108. Beneath trap door 111 is the finger piece 115. Therefore, when the coins are ejected from the coin tubes they slide down the chute 110 onto trap door 111. Thus by pushing against finger piece 115 with the tips of the fingers the trap door is tilted downwardly and the money may slide into the palm of the hand, side piece 116 serving to prevent the money from sliding sidewise over the door. Spring 117 serves to bring the door back into its closed position. However, should it be desired to hold the door open the hook 118, shown in Fig. XXVIII, which is pivotally mounted to a small auxiliary front plate 119, can be swung into position and holds the trap door downward as shown in Fig. XXVII. The front and side walls in the way of said tray are cut away as shown in Fig. I.

The machine that I have shown here is the one in which I have embodied my invention for the market but there are many modifications of the same. For instance, by rearranging the key buttons I can make the same machine serve as a machine paying any desired amount of change under $1.00 for such use as in making up a pay roll or for the use of a paying teller in a bank. I can place both characters in different colors upon each key which is a multiple of five, making the machine into an automatic change maker and payer, or virtually having two machines in one.

If I were to make the machine a change payer, I would have the buttons indicate the amount of change ejected, that is, the 30 button would eject 30 cents. If I were to make the machine both a payer and an automatic change maker, I would have on the button shown, as for instance, the 95 button, 95 in one color and a 5 in another color and so on with the others which are multiples of 5. The penny buttons, however, would not be changed. With the condensed keyboard as shown, I am enabled to spread the buttons farther apart thereby reducing the liability of unintentional depression of more than one button to a minimum. It will be noted that all of the parts of importance operate on the pivotal principle and no part slides in proximity to any other thereby causing friction and endangering accuracy. By arranging the penny buttons in the center of the main key board, it enables the operator to strike them simultaneously with the other, the advantage of which is plain.

I have shown my coin paying or change making machine embodied in a specific design. While it has a large number of parts they are in a large measure duplicate stampings, making the machine very economical to manufacture. I desire to state, however, that, broadly considered, these details can be greatly modified. Cast metal might be utilized in place of sheet metal in many parts and other modifications will readily be accomplished. I desire, however, to claim the invention in its specific embodiment as well as broadly, as pointed out in the appended claims.

Having thus described my invention, what I claim as new and desire to secure by Letters Patent, is:

1. In a coin paying or change making machine, the combination of a draw bar carried on longitudinally spaced pivotal supports, a key lever, connections from the key lever to the said draw bar, actuators on the said draw bar, and a coin tray with ejectors to be acted upon by the said actuators, as specified.

2. In a coin paying or change making machine, the combination of a key lever, a rock shaft operated thereby with rock shaft arms thereon, a coin tube tray to receive the coins whereby they will be fed by gravity to the bottom, a slot in the bottom of said tray for the passage of a coin ejector, a bell crank arm with connection to the rock shaft and to the said coin ejector, and a spring connected to the said coin ejector and disposed rearwardly and upwardly therefrom to return the coin ejector to normal position and hold the same yieldingly in the engaging position at the bottom of said coin tray, for the purpose specified.

3. In a coin delivering machine, the combination of a suitable casing, key levers fulcrumed therein, a series of rock shafts supported in suitable bearings in said casing, coin trays, coin ejectors for ejecting a predetermined number of coins from said coin trays, connections from said ejectors to corresponding rock shafts, draw bars connected to said key levers having laterally projecting actuating lugs extending to the right and to the left alternately with reference to the successive positions of said rock shafts; and arms extending from said rock shafts into the path of travel of said actuating lugs in accordance with the requirements of each of said key levers, substantially as described.

4. In a coin delivering machine, the combination of coin trays, ejecting means coöperating therewith, rock shafts having upwardly projecting arms, key levers having predetermined numeral values, and connections between said key levers and said rock shafts consisting of draw bars having laterally projecting ears or lugs extending to the right and to the left of said draw bars alternately with reference to the successive positions of said rock shafts, substantially as described.

5. In a coin paying or change making machine, the combination of a coin tray of tubular form with a flat bottom and an opening across the bottom, a coin ejector adapted to reciprocate across the bottom with a portion adapted to rest against the bottom and be guided thereby, and a second portion adapted to enter the slot across the bottom provided with a coin engaging hook portion with a rounded surface in advance thereof to insure proper engagement of the coin, and means for holding the same yieldingly against the bottom of said tray, as specified.

6. In a coin delivering machine, the combination of a suitable coin tray, and coin ejecting means coöperating therewith comprising a pivoted arm carrying a coin engaging notched catch having an inclined surface for engaging the bottom of said tray, and a clip located to one side of said catch and adapted to bear upon the under side of said coin trays when said ejectors are in normal position, substantially as described.

7. In a coin paying or change making machine, the combination of a tubular coin tray disposed in inclined position, a slot across the bottom for the passage of the coin ejector, and a cutaway portion at the bottom rear angle of said tray for engaging above the top of the bottom coin contained therein to prevent displacement thereof by operation of the ejector when the supply of coins has become low in the tray.

8. In a coin delivering machine, the combination of a movable coin ejector and coin trays coöperating therewith having at the rear of the same an opening in position to receive the rear edge of the last coin to be ejected during the return movement of said ejecting means after ejecting the next to the last coin in any tray, and means normally urging said ejector upwardly, substantially as described.

9. In a coin delivering machine, the combination of movable coin ejectors, coin trays with which said ejectors coöperate, means normally urging said ejectors upwardly against the bottom of said coin trays, and means carried by said coin trays for locking the last coin to be ejected against operative displacement during the return movement of the ejector after ejecting next to the last coin in any tray, substantially as described.

10. In a change making machine, the combination of tubular coin trays, ejectors with means for actuating the same, means for holding the same yieldingly in position, an eliminator key, a lever with a depressing roll thereon disposed to act upon the ejector and move it from operative position, connections from the eliminator key to actuate said lever, and releasable lock means for holding the same in engagement, and a release key with connections for releasing the lock, as specified.

11. In a change making machine the combination of tubular coin trays, ejectors with means for actuating the same, means for holding the same yieldingly in position, an eliminator key, a lever with a depressing roll thereon disposed to act upon the ejector and move it from operative position, and connections from the eliminator key to actuate said lever, as specified.

12. In a coin paying or change making machine, the combination of a suitable casing, a series of tubular trays, a back plate to which said trays are detachably secured, notched engaging members on said trays, a transverse plate in said machine to be engaged by said notched engaging members, a locking rock bar to swing into engagement with said engaging members, a release key; and connections from the said rock bar to the release key of the machine, as specified.

13. In a coin paying or change making machine, the combination of a suitable casing, a series of tubular trays, a back plate to which said trays are detachably secured, notched engaging members on said trays, a transverse plate in said machine to be engaged by said notched engaging members, and a locking rock bar to swing into engagement with said engaging members.

14. In a coin paying or change making machine, a tubular coin tray with projecting engaging lugs at the back thereof and a notched engaging member secured to the lower portion thereof, a back plate notched and perforated to receive said engaging members, and screws for locking the same in position, as specified.

15. In a coin paying or change making machine, a tubular coin tray with projecting engaging lugs at the back thereof and a notched engaging member secured to the lower portion thereof, and a back plate notched and perforated to receive said engaging members, as specified.

16. In a coin paying or change making machine, a tubular coin tray with projecting engaging lugs at the back thereof and a notched engaging member secured to the lower portion thereof, a back plate notched and perforated to receive said engaging members, and a locking means for retaining said separable trays in position.

17. In a coin delivering machine, the combination of individual trays for carrying coin of different denominations, rearwardly extending notched ears projecting from said trays, a carrying plate having notches to receive said ears, a swinging locking means adapted to swing over said projecting ears, a release key and connections between said swinging means and said release key, substantially as described.

18. In a coin delivering machine, the combination of individually removable coin trays, a common mounting for said trays, a detachable connection between said common mounting and said machine, a locking means common to all of said individually removable trays, a releasing means for said locking means, a release key, and connections between said release key and said releasing means, substantially as described.

19. In a coin delivering machine, the combination of individually removable coin trays, a mounting plate therefor, a latching means for latching all of said trays, and a releasing means for said latching means, substantially as described.

20. In a coin delivering machine, the combination of coin trays, a suitable mounting therefor, means for rendering said trays removable from said machine either as a unit, or individually, a latching means for latching said trays in normal operative position, and a releasing means for releasing said latching means, substantially as described.

21. In a coin delivering machine, the combination of key levers detachably fulcrumed in said machine, draw bars carried upon pivotal supports, detachable connections between said draw bars and said key levers, consisting of a hook and cross pin, actuating projections extending from said draw bars, coin trays and ejecting means therefor actuated by said actuating projections, substantially as described.

22. In a coin delivering machine, the combination of suitable coin trays, ejectors coöperating therewith pivotally mounted upon swinging arms, an angular projection from each of said ejectors near the pivotal point thereof, a stopping member adapted to arrest the rearward movement of said ejectors by contacting with said angular projection, and a single spring attached to each of said ejectors for maintaining same in normal coöperative position with relation to said coöperative coin tray, and also for returning said ejector toward normal position, substantially as described.

23. In a coin delivering machine, the combination of suitable coin trays, ejectors coöperating therewith, pivotally mounted on swinging arms, means for forcing said swinging arms and ejectors forwardly, and a single spring attached to each of said ejectors for maintaining a slight tension between said ejectors and said coin trays, and for returning said ejectors to normal position, an angular projection extending from each of said ejectors near the pivotal mounting thereof, and a stop to engage said angular projections and arrest the rearwardly movement of said ejectors, substantially as described.

24. In a coin delivering machine, the combination of suitable coin trays, ejectors coöperating therewith pivotally mounted upon swinging arms, means for forcing said swinging arms and ejectors forwardly and a single spring attached to each ejector for maintaining coöperative relation with its respective coin tray, and for returning same to normal position, a contact point on each of said ejectors below the pivotal mounting thereof, and a stop adapted to contact with said contact point and limit the rearward movement of said ejectors, substantially as described 25. In a coin delivering machine, the combination of suitable coin trays, ejectors coöperating therewith, keys for actuating said ejectors, and a single means coöperating with said ejectors for stopping said ejectors in their rearward movement, and for forcing said ejectors into coöperating relation with their respective coin trays, substantially as described.

26. In a coin delivering machine, the combination of suitable coin trays, pivotally mounted coin ejectors coöperating therewith, means for forcing said ejectors forwardly, means for returning same toward normal position, and a stop adapted to abut said ejectors at a point below the pivotal point thereof, to limit the rearward movement of the same and tip the forward end upwardly, substantially as described.

27. In a coin paying or change making machine, the combination of key levers arranged in a substantially horizontal plane, draw bars arranged in a plane substantially parallel with the plane of said key levers and carried on pivotal supports, and connections between the front end of said key levers and said draw bars for reciprocating said draw bars when said key levers are actuated.

28. In a coin paying or change making machine, the combination of key levers arranged in a substantially horizontal plane, draw bars mounted above said key levers and in a plane substantially parallel with the plane of said key levers and carried on pivotal supports, and connections between said draw bars and said key levers for reciprocating said draw bars when said key levers are actuated.

In witness whereof, I have hereunto set my hand and seal in the presence of two witnesses.

GLENN J. BARRETT. [L. S.]

Witnesses:
  FRANK W. MOSHER,
  EVERETT E. THAYER.